Jan. 9, 1951

R. W. BROWN 2,537,650

STEERABLE AIRCRAFT UNDERCARRIAGE

Filed March 7, 1947

INVENTOR

Roy W. Brown

BY

Ely & Frye

ATTORNEYS

Jan. 9, 1951     R. W. BROWN     2,537,650
STEERABLE AIRCRAFT UNDERCARRIAGE
Filed March 7, 1947     4 Sheets-Sheet 2
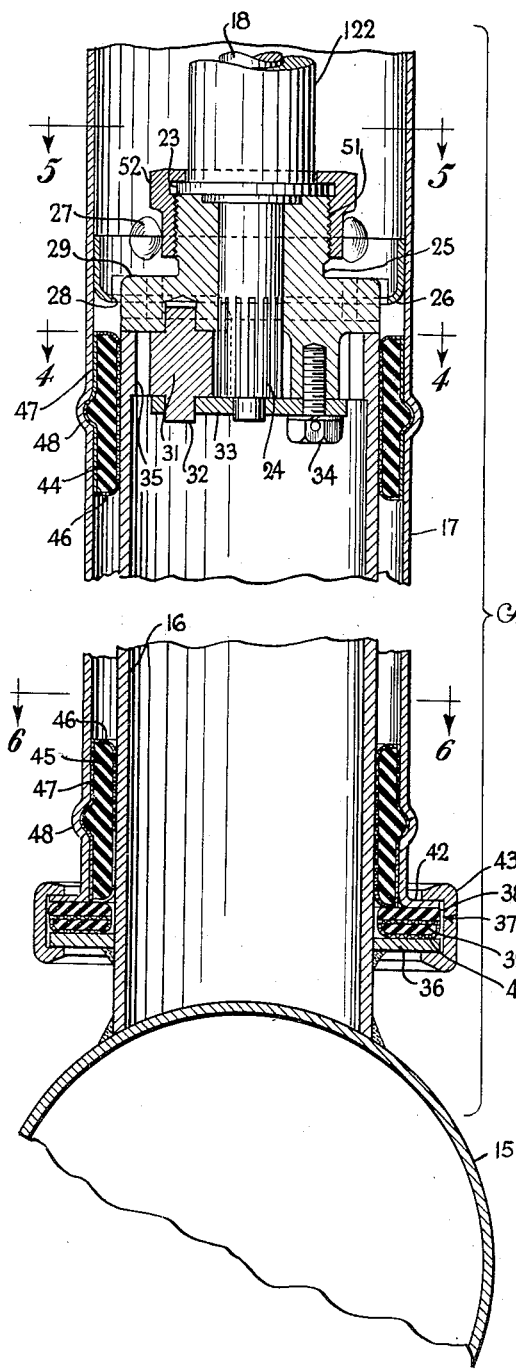
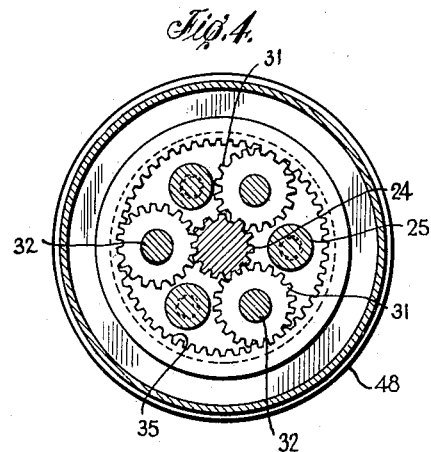
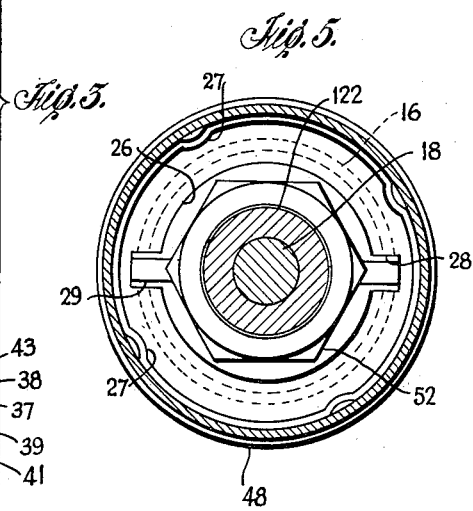
INVENTOR
Roy W. Brown
BY Clyo Frye
ATTORNEYS Jan. 9, 1951               R. W. BROWN               2,537,650
STEERABLE AIRCRAFT UNDERCARRIAGE
Filed March 7, 1947                                      4 Sheets-Sheet 3
*Fig. 6.*
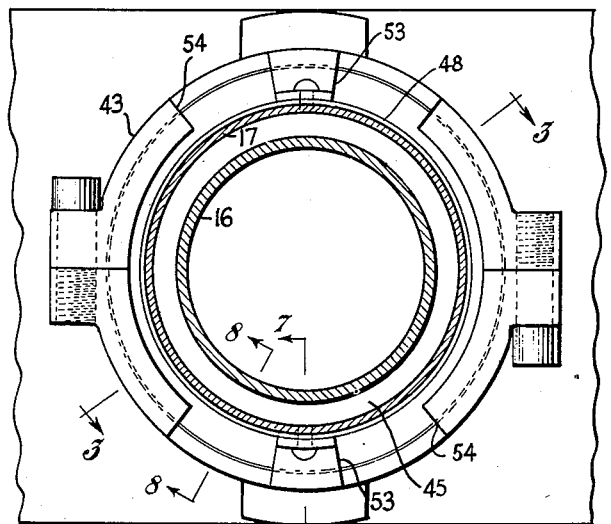
*Fig. 8.*                        *Fig. 7.*
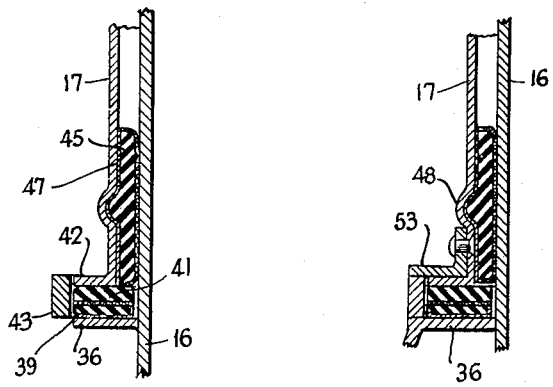
INVENTOR
Roy W. Brown
Ely & Frye
ATTORNEYS Jan. 9, 1951　　　　　　R. W. BROWN　　　　　2,537,650
STEERABLE AIRCRAFT UNDERCARRIAGE
Filed March 7, 1947　　　　　　　　　　　　　　4 Sheets-Sheet 4

INVENTOR
Roy W. Brown
BY
Elyr Frye
ATTORNEYS

Patented Jan. 9, 1951

2,537,650

UNITED STATES PATENT OFFICE 2,537,650

STEERABLE AIRCRAFT UNDERCARRIAGE

Roy W. Brown, Akron, Ohio, assignor to The Firestone Tire & Rubber Company, Akron, Ohio, a corporation of Ohio Application March 7, 1947, Serial No. 733,152

10 Claims. (Cl. 244—50)

This invention relates to aircraft undercarriages, especially to controllable, or steerable aircraft undercarriages of light sturdy construction.

Heretofore there have been some efforts made to provide steerable aircraft undercarriages. Such undercarriages have special value when landing an aircraft at an angle to the prevailing wind, or in other words, when landing an aircraft with a cross wind blowing on it. The various attempts previously made to provide controllable aircraft undercarriages have not been very satisfactory in that all of such constructions known to me have been very bulky and heavy and hence objectionable in aircraft construction, or the undercarriages have been of light construction and thus not adapted to present aircraft use and conditions.

The general object of the present invention is to avoid and overcome the foregoing and other disadvantages of previous types of steerable aircraft undercarriages and to provide an aircraft undercarriage which is characterized by its low height, light weight and sturdy construction.

A further object of the invention is to provide a positive easily operated control for aircraft undercarriages.

Another object of the invention is to provide an uncomplicated, yet sturdy and effectual steering device for aircraft undercarriages.

A further object of the invention is to limit the amount of movement of a steerable aircraft undercarriage.

Another object of the invention is to provide an aircraft undercarriage steering device which has a minimum of parts and is adapted to have a long, serviceable life with a minimum of maintenance and adjustment thereof.

The foregoing and other objects and advantages of the invention will be made apparent as the specification proceeds.

Reference now is made to the accompanying drawings wherein:

Fig. 3 is a vertical section through the steering means of the invention taken on line 3—3 of Fig. 6;

Figure 9:
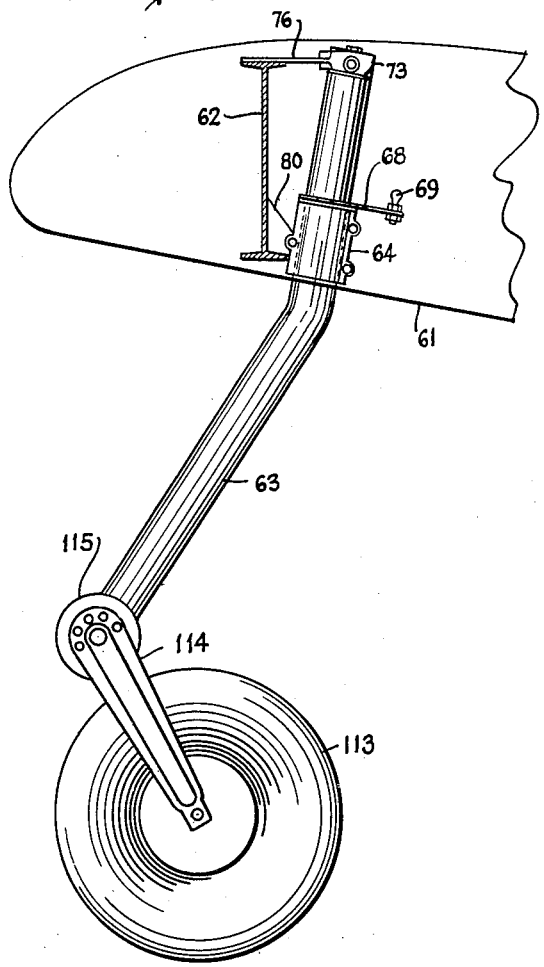
Figure 10:
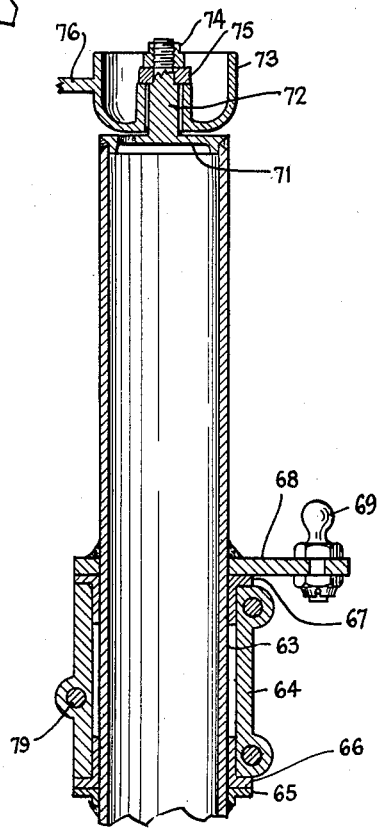

Figs. 4, 5 and 6 are horizontal sections taken on lines 4—4, 5—5 and 6—6, respectively, of Fig. 3;

Figs. 7 and 8 are fragmentary vertical sections taken on lines 7—7 and 8—8 of Fig. 6;

Fig. 9 is an elevation of a modified embodiment of the invention positioned on an aircraft; and Fig. 10 is an enlarged fragmentary section of the means, in Fig. 9, for mounting the member 63 on an aircraft.

Now referring in detail to the structure shown in the drawings, a steerable aircraft undercarriage unit generally indicated at 10 is provided and it may be secured to an I-beam 11 of an aircraft by means of an angle mounting bracket 12. As many units 10 and as many different sizes of units as required will be supplied to support the aircraft. The undercarriage unit 10 includes a conventional aircraft pneumatic tire and wheel unit 13 which is journalled on support member arms 14. These support arms 14 are, in turn, resiliently supported in a mounting unit 15 whereby the arms 14 are resiliently positioned and permitted to move arcuately of the mounting unit 15. The unit 15 has a cylindrical member, usually tubular, 16 which extends upwardly therefrom and is telescopically engaged with a support member 17, usually tubular, for transmittal of load from the tire and wheel unit 13 to the aircraft beam 11.

As one feature of the invention, a flexible shaft 18 is received within the support member 17 and extends from the upper end thereof through a reenforcing beam 19 secured in a conventional manner to the beam 11. The shaft 18 may be a conventional flexible shaft of uniform composition, or else could be formed from a plurality of rigid shaft sections coupled together by suitable universal joint means or the like to provide for rotation of the member as a unit on its longitudinal axis even though positioned in angular form. The upper end of the flexible shaft 18 is exposed and has a pulley 21 secured thereto which pulley can engage with a suitable cable member 22 which in turn connects to means within the aircraft for controlling the arcuate position of the tire and wheel unit 13 with relation to the longitudinal axis of the undercarriage unit 10.

As best shown in Fig. 3, the shaft 18 may be encased in a suitable cover 122 which has a flanged lower end 23 whereas the shaft 18 has a gear means, such as splines 24 formed on its lower end. The lower end of the shaft 18 is secured within a gear case or housing 25 that is received within the support member 17 and held against movement with relation thereto. To this end, a cup-shaped disc 26 is positioned in the member 17 and is secured thereto by conventional means, such as by pressing in dimples 27, into the support member and the cup 26. A pair of diametrically opposed slots 28 are formed in the cup member 26 and they receive lugs 29 formed on the gear housing 25 to retain it in engagement with the cup 26 and prevent relative rotational movement of the gear housing and support member. The splines 24 on the flexible shaft 18 are received within the gear housing 25 and they engage with a plurality of circumferentially spaced planetary gears 31 which have shafts 32 extended therefrom. The planetary gears 31 are retained in the gear housing 25 by means of a cover plate 33 that is secured to the lower end of the gear housing 25 by means of screws 34. The shafts 32 of the gears 31 engage with the cover plate 33 and housing 25 so as to be rotatably mounted therein.

So as to connect the member 16 with the member 17 and positively control their relative rotational positions, an internal gear 35 is formed on or suitably secured to the upper end of the member 16 in the bore thereof, as shown in Figs. 3 and 4. Thus this internal gear 35 engages with the planetary gears 31 so that the shaft 18 can cause relative rotation between the members 16 and 17, when desired, through the gear means connecting the two elements.

Of course, the load carried by the wheel unit 13 must be transmitted to the aircraft support member 17 so as to permit relative rotational movement therebetween about the longitudinal axis of the member 17. To this end, a flange plate 36 is secured to the periphery of the member 16 adjacent the unit 15 and a thrust bearing 37 is positioned on the upper surface thereof, as shown in Fig. 3. Bearing 37 may include a rubber member or ring 38 that is positioned on a rubber ring 39 which has a friction material cover 41 secured therearound, which cover preferably is formed of a special composition and is integrally bonded to the rings 38 and 39 with the friction material having the unusual property of greater kinetic than static friction. This property is achieved by impregnating the fabric with a thixotropic lubricating composition including castor oil, a wax compatible with the oil, and an aluminum soap dispersed in the composition.

Graphite may also be present in the friction material impregnating the composition. To secure the support member 17 to the mounting unit 15 and its associated means, a flange 42 is formed on the lower end of member 17 and a suitable split clamp 43 is provided to retain the flanges 42 and 36 in assembly with the thrust bearing 37 being positioned therebetween.

In order to render the structure of the invention sturdy, and to retain the members 16 and 17 in telescoped association for rotative movement therebetween, bushings 44 and 45 are permanently positioned between the associated telescoped portions of the members 16 and 17. Both of the bushings 44 and 45 may comprise an annular body which is made of rubber or rubber-like material (as may the rings 38 and 39), which has friction material 46 secured to its bore. Preferably sleevelike metal plates 47 are associated with and usually permanently bonded to the rubber cores of the bushings 44 and 45 so that the bushings can be locked in position in the support member 17. To this end, when the bushings 44 and 45 are telescoped into position in the member 17, annular sections 48 are suitably expanded out in vertically spaced parts of the bushing and support member assembly. These sections 48 retain the bushings in fixed association with the support member for transmittal of load therethrough.

Preferably the upper end of the gear case 25 is threaded as at 51 and a lock nut 52 engages with this threaded section 51 and with the flange 23 on the cover 122 so as to retain such cover and the member 18 in position in the support member 17.

Figure 1:
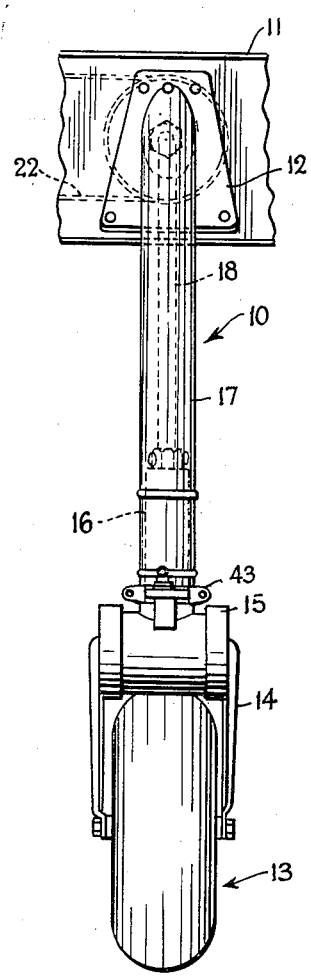
Fig. 1 is an elevation of one unit of an aircraft undercarriage embodying the principles of the invention.
Figure 2:
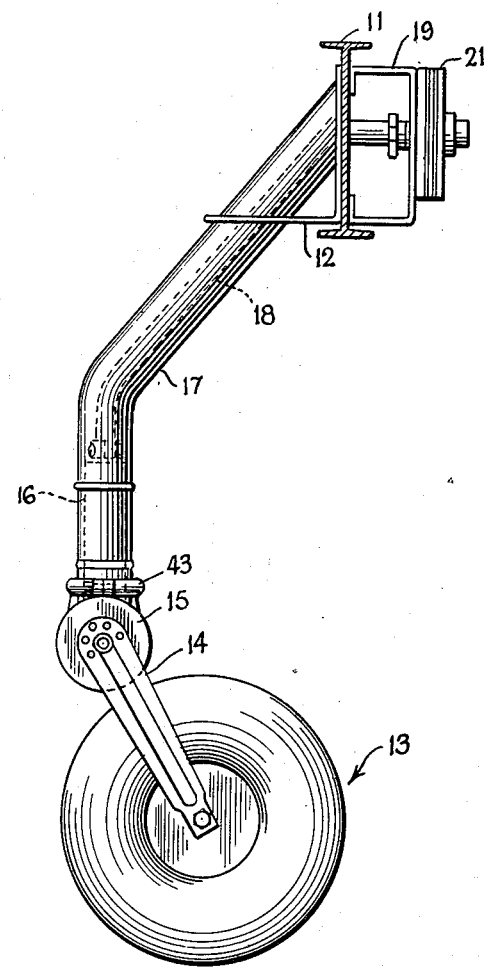
Fig. 2 is a side elevation, partly in section, of the aircraft undercarriage unit of Fig. 1.

Fig. 2 illustrates that the wheel unit 13 trails the cylindrical member 16 and this aids in eliminating any tendency for shimmy of the unit about the longitudinal axis of the member 16. It will be noted that the member 16 functions as a castor pintle for the wheel unit 13 as the arms 14 and torsion unit 15, with the clamp 43 and member 17, support the wheel unit for arcuate movement about the axis of the lower end of member 17. By use of the pulley 21 and control cable 22, the wheel unit 13 can be adjusted about the vertical axis of the member 16 to take any desired angular position with relation to the aircraft beam 11 and it can be retained in such position so that, if desired, the aircraft can be landed readily on the ground even though the aircraft is proceeding at an angle other than directly into the wind. In other words, the aircraft would be adapted to more or less retain and maintain its side slip produced by a cross wind blowing on the aircraft while it is landing. If necessary, a more positive steering control may be provided in place of the pulley 21 and control cable 22.

In order to control the amount of relative arcuate movement between the member carrying the pneumatic tire and wheel unit or other ground or surface contact member, and the support member 17, which is engaged with an aircraft to support same, stop or motion limiting means may be provided on the undercarriage unit of invention. In Figs. 6, 7 and 8 there is shown one embodiment of means for limiting arcuate movement of the embodiment of the invention disclosed herein in Figs. 1 through 8 but which can be used on any embodiment of the invention. The motion limiting means are associated with the split clamp 43 and include stop lugs 53 which are secured to diametrically opposed portions of the support member 17. The stop lugs 53 are immediately above the flange 42 and are received in cut-out sections 54 of the clamp 43. Fig. 6 of the drawings best shows that the split clamp 43 has two diametrically opposed cut-out sections 54 formed in its upper surface, but that the remainder of the clamp, which is substantially C shaped in section, is continuous around each semi-circular portion of the member 17 so as to retain the flanges 36 and 42 in engagement. Of course, the stop lugs 53 are adapted to abut upon or against the portions of the clamp defining the cut-out sections 54 when the members 16 and 17 are rotated a sufficient distance with relation to each other. It will be realized that the cut-out sections 54 can be made of any desired length so as to control the amount of relative arcuate movement permitted.

Referring now to Figs. 9 and 10 it will be seen that a simplified adaption of the invention is shown in these drawings. In this instance, an aircraft wing is indicated at 61 with a support beam 62 being positioned therein. An aircraft wheel unit 113, support arms 114 and a control unit 115 are provided in this embodiment of the invention. In this instance, however, a bent tubular member 63 is provided for connecting the member 115 and its associated means on the aircraft support beam 62. This support member 63 may be of other than tubular shape, but in all events, has an annular section which is engaged with and extends through annular mounting bracket 64 that is pivotally secured to the beam 62 by pin 79 that engages a bracket 80 carried by the beam 62. An annular flange 65, or equivalent means is secured in any conventional manner to the outer periphery of the member 63 adjacent its upper end and a flanged bearing 66 is positioned on this flange 65 and engages with the mounting bracket 64 to position the member 63 rotatably therein. Preferably, a second flanged bearing 67 is associated with the upper end of the bracket 64 to aid in rotatably positioning the arm 63 therein and for transmittal of load therebetween.

To control the angular positioning of the support member 63 in bracket 64, a lever arm 68 having an engagement knob 69 secured thereto is rigidly secured to the support arm 63 at the upper portion of the support bracket 64. Hence, conventional steering linkages can be connected to the knob 69 to move the member 63 arcuately with relation to the support bracket 64.

Preferably, the upper end of the member 63 is also adapted to transmit load to the aircraft beam 62 and it is fixedly secured to such beam so as to be rotatable on its longitudinal axis with relation to beam 62. To this end, a plug 71 having a stud shaft 72 extending therefrom is fixedly secured in the upper end of the member 63 and a cup-shaped bearing member 73 is secured to this stud 72 by a nut 74 which has a thrust washer 75 positioned between it and the upper end of the cup-like engagement member 73. The cup member 73 has a connector bar 76 extended therefrom which can be welded or otherwise secured to the beam 62.

From the foregoing it will be seen that only a conventional height aircraft undercarriage is used by the invention and that only a minimum of apparatus and control members have been added to a conventional aircraft undercarriage so as to provide the improved steerable undercarriage embodying the invention as disclosed herein.

Several complete embodiments of the invention have been described herein in detail, but it will be understood that the scope of the invention is not limited to such examples, as modification may be resorted to within the scope of the appended claims.

What is claimed is:

1. In a steerable aircraft undercarriage, a tubular member having a flanged lower end and being adapted to engage with an aircraft, an open center cup secured to said tubular member at its load receiving end, a housing member slidably received in said cup and engaged thereby to prevent relative rotation therebetween, a flexible shaft having a splined end, means securing said flexible shaft to said housing member with said splined end being positioned therein, a plurality of planetary gears, means journalling said planetary gears in said housing member, a member having an upper end and being adapted to engage with and support an aircraft wheel, said wheel support member being telescoped into engagement with said tubular member, an internal gear associated with the upper end of said wheel support member and engaged with said planetary gears for rotation thereby, said housing being abutted against and supported by the upper end of said wheel support member, said wheel support member having a flange on its periphery, a thrust bearing positioned on the flange on said wheel support member, the flange on said tubular member bearing on said thrust bearing so as to support said tubular member thereon for relative rotational movement, and friction bearings positioned between the telescoped sections of said wheel support member and said tubular member to aid in positioning same for relative arcuate movement, said friction bushings having metal backing plates engaged with said tubular member.

2. In a steerable aircraft undercarriage, a tubular member provided with a flanged lower end and being adapted to engage with an aircraft, an open center cup member secured to said tubular member at its load receiving end, a housing member slidably received in said cup and engaged thereby to prevent relative rotation therebetween, a flexible shaft having a splined end, means securing said flexible shaft to said housing member with said splined end being positioned therein, a plurality of planetary gears, means journalling said planetary gears in said housing member, a member provided with a tubular upper end and being adapted to engage with and support an aircraft wheel, the tubular end of said wheel support member being telescoped into engagement with said tubular member, an internal gear associated with the upper end of said wheel support member and engaged with said planetary gears for rotation thereby, said housing being supported by the upper end of said wheel support member, said wheel support member having a flange on its periphery, a thrust bearing positioned on the flange on said wheel support member, the flange on said tubular member bearing on said thrust bearing so as to support said tubular member thereon for relative rotational movement, and bearings positioned between the telescoped sections of said wheel support member and said tubular member to aid in positioning same for relative arcuate movement.

3. A relatively short, light weight steerable aircraft undercarriage comprising a bent tubular support, a flexible shaft positioned within said support, said shaft being splined at its inner end which terminates in said support, housing means positioned around the splined end of said shaft, a plurality of planetary gears journalled in spaced circumferential positions in said housing means and meshed with the splined end of said shaft, a support unit having a tubular member extending therefrom in telescoped engagement with said tubular support, means engaging said tubular support with the tubular member of said support unit for relative rotational movement, said tubular member having an internal gear formed thereon that engages with said planetary gears, and a wheel assembly carried by said unit whereby said wheel assembly can be rotated about the axis of and with relation to said tubular support by said flexible shaft.

4. An aircraft undercarriage comprising a bent tubular support member having an open upper end, a pneumatic tire and wheel assembly, wheel positioning means resiliently positioning said tire and wheel assembly, a mounting member associated with said wheel positioning means and telescoped into engagement with said support member, means securing said mounting member to said support member for arcuate movement therebetween, a steering member extending through said support member to protrude from the upper end thereof, gear means connecting said steering member to said mounting member, and control means for engaging with the end of said steering member for rotating it and said mounting member on their longitudinal axes with relation to said support member to control the arcuate position of said wheel assembly with relation to the longitudinal axis of said support member.

5. An aircraft undercarriage comprising a bent tubular support member having an open upper end, a pneumatic tire and wheel assembly, wheel control means resiliently positioning said tire and wheel assembly, mounting means associated with and secured to said support member for arcuate movement with relation thereto, said wheel control means being secured to said mounting means, a flexible member secured to said mounting means and extending through said support member to protrude from the upper end thereof, and means for engaging with the end of said flexible member for rotating it and said mounting means with relation to said support member.

6. A relatively short, light weight steerable aircraft undercarriage comprising a support, a rotatable shaft member positioned within said support and having one end terminating therein, said shaft being splined at its inner end which terminates in said support, housing means positioned around the splined end of said shaft member, a gear journalled in said housing member and meshed with the splined end of said shaft member, wheel assembly support means having a member extending therefrom which is telescoped into engagement with said support, means securing said support to said support means for relative rotational movement, and a gear associated with said member of said support means and engaging said gear in said housing member whereby said wheel assembly support means can be rotated about the longitudinal axis of said member by rotation of said shaft member.

7. An undercarriage as in claim 6 wherein means are provided for limiting the relative arcuate movement of said support and said support means.

8. An undercarriage as in claim 6 wherein a split clamp member is provided to engage with said support and support means to retain them in engagement, and stop lugs are secured to said support to engage with said clamp member to limit relative arcuate movement of said support and support means.

9. A steerable aircraft undercarriage comprising an elongated member adapted to engage with an aircraft, a second member, means engaging said members for limited axial and arcuate movement therebetween, a support unit secured to said second member, a flexible shaft within said elongated member, and means engaging one portion of said flexible shaft with said second member, said latter means comprising an internal gear ring rigidly attached to said second member, gear means in the form of splines on the lower end of said shaft, the teeth of said gear ring and said splines being in driving relation whereby the other end of said shaft can be controlled from an aircraft to vary the relative arcuate position of said second member and support unit to the longitudinal axis of said elongated member.

10. In a steerable aircraft undercarriage, a tubular member having a flanged lower end and being adapted to engage with an aircraft, an open center cup secured to said tubular member at its load receiving end, a housing member slidably received in said cup and engaged thereby to prevent relative rotation therebetween, a flexible shaft having a splined end, means securing said flexible shaft to said housing member with said splined end being posititoned therein, a plurality of planetary gears, means journalling said planetary gears in said housing member, a member having an upper end and being adapted to engage with and support an aircraft wheel, said wheel support member being telescoped into engagement with said tubular member, an internal gear associated with the upper end of said wheel support member and engaged with said planetary gears for rotation thereby, said housing being abutted against and supported by the upper end of said wheel support member, said wheel support member having a flange on its periphery, a thrust bearing positioned on the flange on said wheel support member, said thrust bearing comprising two superimposed annular members made of rubber-like material, and a friction material cover positioned around one of said members and vulcanized and integrally bonded to both of said members to form a unitary structure therewith, the flange on said tubular member bearing on said thrust bearing so as to support said tubular member thereon for relative rotational movement, and friction bearings positioned between the telescoped sections of said wheel support member and said tubular member to aid in positioning same for relative arcuate movement, said friction bushings having metal backing plates engaged with said tubular member.

ROY W. BROWN.

REFERENCES CITED

The following references are of record in the file of this patent:

UNITED STATES PATENTS

| Number | Name | Date |
|---|---|---|
| 1,359,566 | Bender | Nov. 23, 1920 |
| 1,740,197 | Muller | Dec. 17, 1929 |
| 1,786,649 | Gonzales | Dec. 30, 1930 |
| 2,279,074 | Stearman | Apr. 7, 1942 |
| 2,333,550 | Parker | Nov. 2, 1943 |
| 2,372,710 | Chisholm | Apr. 3, 1945 |
| 2,394,825 | Trader | Feb. 12, 1946 |
| 2,396,318 | De Bell | Mar. 12, 1946 |
| 2,460,506 | Jamison | Feb. 1, 1949 |

FOREIGN PATENTS

| Number | Country | Date |
|---|---|---|
| 421,223 | Great Britain | Dec. 17, 1934 |